United States Patent [19]

Narbaits-Jaureguy et al.

[11] 3,868,575

[45] Feb. 25, 1975

[54] LIMITED-RANGE RADIOCOMMUNICATION SYSTEM WITH DIRECTION-INDICATING SIGNALING MEANS

[75] Inventors: Jean Raymond Narbaits-Jaureguy; Henri Billottet, both of Paris, France

[73] Assignee: Thomson–CSF, Paris, France

[22] Filed: May 24, 1973

[21] Appl. No.: 363,730

[30] Foreign Application Priority Data

May 26, 1972 France .............................. 72.18881

[52] U.S. Cl. ........................... 325/51, 178/82, 246/8

[51] Int. Cl. ............................................ H04b 1/00

[58] Field of Search ............ 325/51, 52, 64; 178/82; 246/8, 30

[56] References Cited

UNITED STATES PATENTS

| | | | |
|---|---|---|---|
| 2,611,075 | 9/1952 | Marlowe | 179/82 |
| 3,539,924 | 11/1970 | Daskalakis et al. | 325/51 |
| 3,629,707 | 12/1971 | Baba et al. | 325/51 |

*Primary Examiner*—Robert L. Griffin
*Assistant Examiner*—George H. Libman
*Attorney, Agent, or Firm*—Karl F. Ross, Herbert Dubno

[57] ABSTRACT

Vehicles traveling along a predetermined route are equipped with mobile receivers picking up traffic information from a radiating transmission line extending along the route, this information being modulated upon a first carrier F1 for vehicles traveling in one direction and upon a second carrier F2 for vehicles traveling in the opposite direction. Two ancillary short-range transmission stations, located at opposite ends of the line, radiate amplitude-modulated carrier waves directly to vehicles in the vicinity thereof whose receivers are tuned to either of the two carriers F1, F2. The first ancillary station emits the two carriers both modulated with a low-frequency signal *f*1 whereas the second ancillary station emits the same carriers modulated with a different low-frequency signal *f*2. A discriminating circuit aboard each vehicle, upon the reception of an amplitude-modulated carrier, tunes the receiver thereof either to the carrier F1 in response to a detected signal f1 or to the carrier F2 in response to a detected signal f2.

15 Claims, 4 Drawing Figures

LIMITED-RANGE RADIOCOMMUNICATION SYSTEM WITH DIRECTION-INDICATING SIGNALING MEANS

CROSS REFERENCE TO RELATED APPLICATION

This application is related to our copending and commonly owned application Ser. No. 208,172 filed Dec. 15, 1971, now U.S. Pat. No. 3,760,278.

BACKGROUND OF THE INVENTION

The present invention relates to limited-range radiocommunication system and, more particularly, to improvements in our prior system concerning a ground transmitter station and a mobile receiver station installed on board a vehicle and designed to receive simultaneously modulating signals from a radio transmitter and signals from a transmitter specially designed, in a given zone, to transmit data pertaining to traffic. These improvements are directed toward automatic tuning of the vehicle-borne receiver to the frequency which corresponds to the direction of displacement of the vehicle along the route equipped with the limited-emission communication means.

The radiocommunication system of our prior patent operates with limited-range emission between a fixed control station and several mobile stations, the fixed station containing a transmitter section and a receiver section coupled to a common transmitting/receiving antenna in the form of an elongate line with inherent losses extending along the route to be monitored. The line emits low-strength high-frequency radiation which is picked up by the antennas of the vehicles in the vicinity.

As further disclosed in that patent, a receiver of a vehicle-borne station is equipped with a switch controlled by the modulating signals from the transmitter of the fixed control station, this switch giving priority of reception and listening-in to the signals from the control station over signals from regional transmitters which the receiver of the vehicle is capable of picking up.

Fundamentally, the transmitter and receiver devices described in our prior patent use a single carrier frequency. However, two or more carrier frequencies have been envisaged in order to separate certain kinds of information, together with means for receiving and decoding these different kinds of signals at the receiving end.

Pursuant to our present improvement, messages such as traffic information to be communicated to the several mobile stations via the radiating transmission line is modulated upon two carrier frequencies F1 and F2 assigned to different directions of motion along the line. In order to insure the adjustment of the receiver of any mobile station to the carrier frequency corresponding to its direction of motion, each of two ancillary short-range transmission stations adjacent opposite ends of the line radiates both carriers F1 and F2 directly to the mobile stations in the vicinity thereof, the carriers of one ancillary station being modulated with a low-frequency signal f1 whereas the carriers of the other ancillary station are modulated with a different low-frequency signal *f2*. Upon detection of such a modulated carrier by any mobile station, its receiver is tuned to the carrier corresponding to its direction of motion as determined by the point of entry of the mobile station into the predetermined zone of surveillance marked by the transmission line; this tuning is advantageously carried out automatically, by a discriminating circuit responding to one or the other modulating signal *f1*, *f2* for controlling a switchover circuit which may comprise a relay-operated switch.

BRIEF DESCRIPTION OF THE DRAWING

The above and other features of our invention will now be described in detail with reference to the accompanying drawing in which.

SPECIFIC DESCRIPTION

Figures 1, 2:
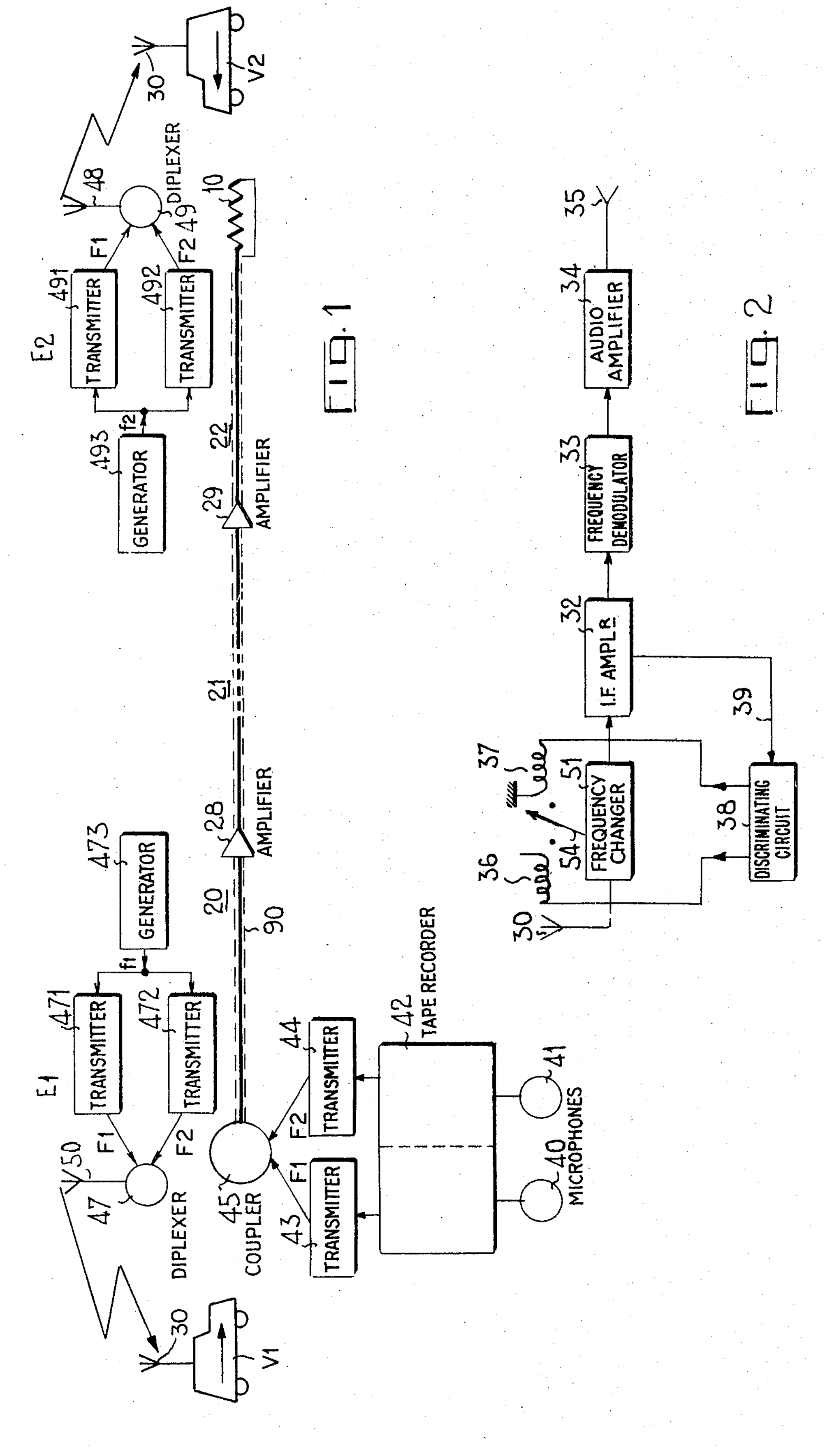
FIG. 1 is a block diagram of a transmitter station operating an two frequencies, in accordance with the invention.
FIG. 2 is a block diagram of a vehicle-borne receiver station associated with the transmitter station shown in FIG. 1.

Referring to FIG. 1, we will now describe a fixed transmitter station which is capable of transmission at two frequencies, one of these frequencies being assigned to data relating to a vehicle V1 travelling in one direction, the other being assigned to data relating to a vehicle V2 moving in the other direction.

FIG. 1 duplicates FIG. 5 of our patent U.S. No. 3,760,278, showing the transmitter section operating at two frequencies, with addition of circuits specific to the present invention.

The two types of data transmitted are recorded on a tape recorder 42 with two separate groups of tracks, operating continuously, by two microphones 40 and 41. Each of the tape recorder tracks is connected to a respective transmitter 43, 44 whose signals frequency-modulate the selected carrier frequencies, namely F1 and F2, assigned to opposite directions of travel along the route. The two transmitters are connected, through a coupler 45, to an end of a coaxial cable used as antenna, terminated in a dissipative load 10; its several sections 20, 21, 22 are separated by amplifiers 28, 29 whose pass band embraces the two frequencies F1, F2. The system further includes, adjacent opposite ends of the controlled-emission line 90, two similar pieces of ancillary equipment E1, E2 each comprising an antenna 50, or 48 coupled by a respective diplexer 47 or 49 to an associated pair of short-range transmitters 471, 472 or 491, 492 whose outputs are amplitude-modulated by a signal coming from a respective generator 473 or 493.

The antennas 48 and 50 are directional, creating around themselves a limited-emission zone so that only nearby vehicles can pick up the energy which they radiate.

The paired ancillary transmitters 471, 472 and 491, 492 supplying these antennas are of low power and are tuned to carrier frequencies F1 and F2, respectively. For example, the transmitters 471 and 491 will be tuned to the frequency F1 whereas the transmitters 472 and 492 are tuned to the frequency F2. The modulating signal produced by the respective generator 473 or 493 identifies the side from which a vehicle enters the limited-emission zone under surveillance. Generator 473, may, for example, emit a modulating frequency *f1* on the order of 1 KHz whereas the generator 493 may emit a modulating frequency *f2* on the order of 3 KHz. Hence, modulating frequencies *f1* and *f2* mark the points of entry of vehicles traveling in the directions assigned to carrier frequencies F1 and F2, respectively.

Thus, depending upon the direction of travel, each vehicle entering the limited-emission zone will receive a signal amplitude-modulated by a signal at a frequency *f1* or *f2*; the presence of two different transmitters on each side is due to the fact that the entering vehicle can be tuned to either the carrier frequency F1 or the carrier frequency F2, irrespectively of its direction of travel.

FIG. 2, which substantially duplicates FIG. 6 of prior patent, shows a receiving antenna 30 supplying a frequency changer 51, followed by an intermediate-frequency amplifier 32, a frequency demodulator 33 supplying a low-frequency amplifier 34, and a loudspeaker 35 serving as a means for reproducing the incoming messages. The frequency changer 51 is equipped with a switch 54 enabling it to receive either the frequency F1 or the frequency F2. This switch 54 is controlled, in the example described, by two relay coils 36 and 37, either of which may be energized by a discriminating circuit 38 which identifies the modulation frequency *f1* or *f2* of the signal received by the vehicle, depending upon the latter's direction of travel. With either carrier frequency the intermediate-frequency stage 32 will receive a wave modulated by the signal of frequency *f1* if the vehicle has entered at the left in FIG. 1, or by the signal of frequency *f2* if the vehicle has entered at the right. The discriminating circuit 38, connected by a lead 39 to the amplifier stage 32, identifies the frequency of the modulating signal which, as the case may be, energizes one or the other of the relays 36, 37. It is well understood that these relays can be replaced by any other element which will perform the same function or produce the same result.

Figure 3:
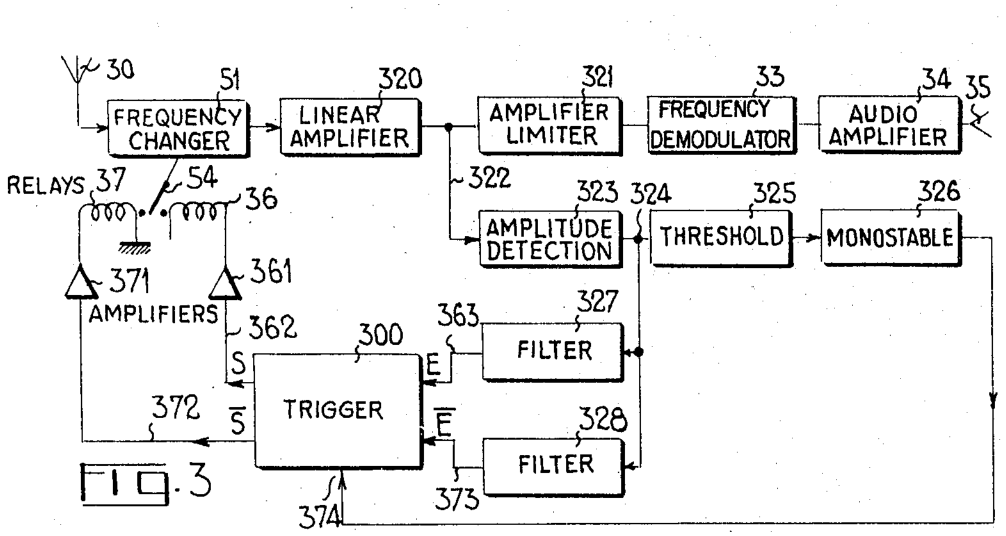
FIG. 3 is a detailed diagram of a discriminating circuit for the automatic tuning of a vehicular receiver.

FIG. 3 more especially illustrates that part of the vehicular receiver which causes an automatic switchover to the carrier frequency F1 or F2 determined by the direction of movement of the vehicle along the route to be surveyed.

In this Figure, as in FIG. 2, there can be seen the antenna 30, the frequency-changer stage 51 with the switch 54 and the two relays 36 and 37, the demodulator stage 33 and the low-frequency amplifier stage 34 followed by the loudspeaker 35. However, the intermediate-frequency amplifier stage 32 is here merged with the frequency changer 51 and is followed by a linear amplifier 320 working into an amplifier-limiter 321 which precedes the demodulator stage 33 serving to recover the low-frequency signals modulating the carrier frequencies F1 and F2.

The intermediate-frequency oscillation coming from the stage 51, which may include the amplitude-modulated signal emitted by one or the other of the the transmitting stations E1, E2, is amplified in the linear amplifier 320 and applied through a lead 322 to an amplitude-detection circuit 323 (forming part of the discriminator 38 of FIG. 2) which at its output produces the modulating signal, of frequency *f1* or *f2*, in the form of a voltage which is proportional to the strength of the received amplitude-modulated carrier. Two filters 327 and 328, respectively tuned to the modulating frequencies *f1* and *f2*, receive the signal produced by the detector 323; the outputs of these filters are connected to the inputs 363 (E) and 373 ($\bar{E}$) of a trigger stage 300 whose outputs 362 (S) and 372 ($\bar{S}$) are respectively connected to the relay coils 36 and 37, by way of amplifiers 361 and 371. Thus, depending upon the case, the trigger stage 300 responds to one or the other of the modulating frequencies. This trigger stage is normally blocked but can be temporarily unblocked at 374 by a signal coming from a monostable actuating circuit 326 which is connected to a threshold circuit 325 supplied by the detector circuit 323. The unblocking signal indicates the presence of an amplitude-modulated radio-frequency field and is necessary in order for the trigger stage 300 to operate and to transmit one or the other of the signals of frequency *f1* or *f2*, which, through the switch 54, determine whether the receiver is tuned to the frequency F1 or F2 corresponding to the direction in which the vehicle is traveling.

Figure 4:
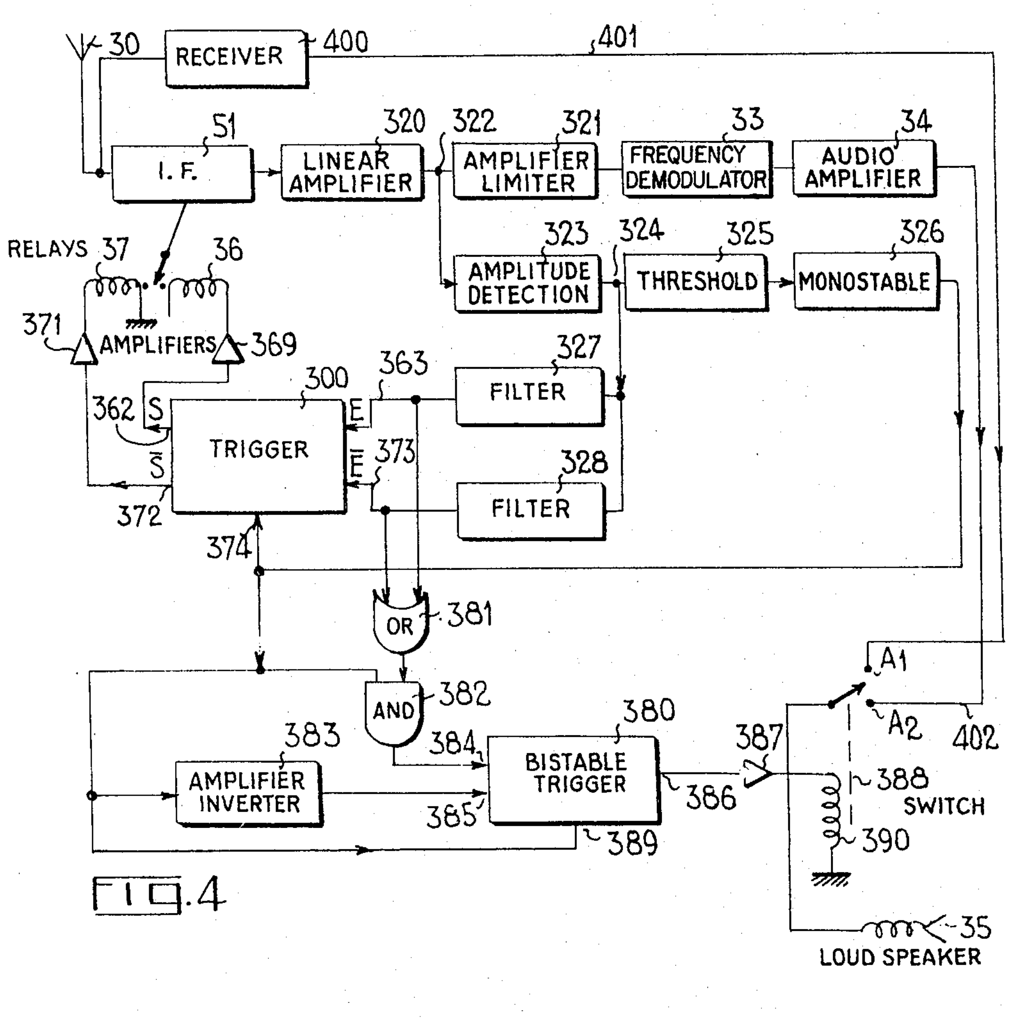
FIG. 4 is a detailed diagram of the automatic tuning system shown in FIG. 3, provided with blocking means for inhibiting its operation outside zones of short-range emission.

FIG. 4 illustrates a more sophisticated receiver of the kind shown in FIG. 3, designed to protect the assembly against parasitic signals which could produce inadvertent triggering.

In this Figure, a car-radio receiver 400 aboard the vehicle and the receiver embodying our invention, specially designed to pick up signals carrying data pertaining to traffic, are coupled to the same antenna 30. References 401 and 402 signify the low-frequency outputs of the receiver 400 and of the audio amplifier 34. These outputs are connected to two terminals A1 and A2, respectively, of a switch 388 controlled by a relay 390 which switches the loudspeaker 35 either to the broadcast side or to the traffic-signal side. The relay 390 responds to a bistable trigger stage 380 controlled, at 389, by a signal coming from the monostable trigger stage 326 and indicating the presence of a radio-frequency field modulated in amplitude by frequency *f1* or *f2*. The bistable trigger stage 380 is supplied at its setting input 384 with a signal indicating the presence of a modulation at frequency *f1* or *f2* in the receiver output, the input 384 being connected to an AND gate 382 receiving the unblocking signal from the monostable trigger stage 326 and the output signal of an OR gate 381 whose two inputs are connected respectively to the outputs of the low-frequency filters 327 and 328 which isolate the modulating frequencies f1 and f2.

At its resetting input 385, this trigger stage 380 receives the unblocking signal coming from the monostable actuator 326, after passage through an amplifier-inverter 383 which together with gates 381 and 382 forms part of a logic circuit. The absence of a signal frequency *f1* or *f2*, in the zone of, surveillance, resets the bistable trigger stage to its zero state. Thus, it is solely the presence of a data emission concerning traffic which will reverse the switch 388 to its alternate position connecting the loudspeaker 35 to the output terminal A2 of amplifier 34 instead of the output terminal A1 of the separate broadcast receiver 400.

What is claimed is:

1. In a limited-range radiocommunication system for the sending of messages from a fixed station provided with high-frequency information-transmitting means to a plurality of mobile stations provided with receiving means for high-frequency energy, said mobile stations traveling in either of two directions along a predetermined route with a first and a second point of entry at opposite ends of said route, the improvement wherein:

said fixed station is provided with a radiating transmission line connected to said information-transmitting means, said line extending along said route;

said information-transmitting means comprises a source of a first and a second carrier frequency, respectively allotted to travel in a first direction from said first to said second point and to travel in a second direction from said second to said first point, individually modulated with information relevant to the corresponding direction of travel;

further comprising— a first ancillary short-range transmission station proximal to said first point for radiating both said first and said second carrier frequency, modulated with a first signal frequency, directly to nearby mobile stations entering upon said route in said first direction; and a second ancillary short-range transmission station proximal to said second point for radiating both said first and said second carrier frequency, modulated with a second signal frequency, directly to nearby mobile stations entering upon said route in said second direction;

each of said mobile stations including receiving means for picking up said carrier frequencies from said transmission line and from either of said ancillary transmission stations, detector means for said first and second signal frequencies connected to said receiving means, and message-reproducing means connected to said detector means, said receiving means being selectively tunable to either of said carrier frequencies in accordance with the output of said detector means.

2. The improvement defined in claim 1 wherein each of said ancillary transmission stations comprises a pair of transmitters for the two signal-modulated carrier frequencies, an antenna, and diplexer means connecting said pair of transmitters to said antenna.

3. The improvement defined in claim 1 wherein each of said mobile stations further includes discriminating means connected to said detector means and tuning means controlled by said discriminating means for automatically adjusting said receiving means to said first carrier frequency in response to said first signal frequency and to said second carrier frequency in response to said second signal frequency.

4. The improvement defined in claim 3 wherein said discriminating means comprises a pair of filters respectively tuned to said first and second signal frequencies, said tuning means including a switchover circuit connected to the outputs of said filters.

5. The improvement defined in claim 4 wherein said switchover circuit comprises a trigger circuit and a pair of relays alternately energizable by said trigger circuit.

6. The improvement defined in claim 5 wherein said trigger circuit is normally blocked, further comprising actuating means responsive to an output from said detector means for temporarily unblocking said trigger circuit to facilitate energization of either of said relays.

7. The improvement defined in claim 6 wherein each of said mobile stations is equipped with a separate receiver for radio broadcasts, said message-reproducing means comprising a loudspeaker common to said receiving means and said separate receiver, each of said mobile stations further comprising switch means normally connecting said loudspeaker to said separate receiver and control means for said switch means responsive to an output from said actuating means for connecting said loudspeaker to said detector means.

8. The improvement defined in claim 7 wherein said actuating means comprises a threshold circuit connected to said detector means for generating an unblocking signal for said trigger circuit in the presence of an incoming signal of predetermined minimum magnitude, said control means including logical circuitry connected to said threshold circuit and bistable means having two inputs connected to said logical circuitry for setting in the presence and resetting in the absence of said signal of predetermined minimum magnitude.

9. The improvement defined in claim 8 wherein said logical circuitry includes an OR gate with inputs connected to the outputs of said filters, an AND gate with inputs connected to the outputs of said OR gate and of said threshold circuit, said AND gate feeding one of the inputs of said bistable means, and inverter means inserted between the output of said threshold circuit and the other input of said bistable means.

10. The improvement defined in claim 9, further comprising a monostable circuit in the output of said threshold circuit delivering said unblocking signal to said trigger circuit, said AND gate and said inverter means.

11. The improvement defined in claim 9 wherein said tuning means comprises an intermediate-frequency stage of said receiving means.

12. The improvement defined in claim 11 wherein said carrier frequencies are frequency-modulated with said information and amplitude-modulated with said first and second signal frequencies, said detector means comprising amplitude-limiting means and a frequency demodulator connected in series to said intermediate-frequency stage and an amplitude detector connected to said intermediate-frequency stage in parallel with said amplitude-limiting means, said loudspeaker being connectable by said switch means to said frequency demodulator, said threshold circuit being connected to said second amplitude detector.

13. The improvement defined in claim 6 wherein said carrier frequencies are frequency-modulated with said information and amplitude-modulated with said first and second signal frequencies, said tuning means comprising an intermediate-frequency stage of said receiving means, said detector means comprising amplitude-limiting means and a frequency demodulator connected in series to said intermediate-frequency stage and an amplitude detector connected to said intermediate-frequency stage in parallel with said amplitude-limiting means, said message-reproducing means being connected to said frequency demodulator, said filters and said actuating means being connected to said amplitude detector.

14. The improvement defined in claim 13 wherein said actuating means comprises a threshold circuit and a monostable circuit in series.

15. The improvement defined in claim 1 wherein said mobile stations are carried aboard vehicles traveling said route, the messages sent from said fixed station pertaining to traffic.

* * * * *